United States Patent
Gulunay et al.

[11] Patent Number: 5,677,892
[45] Date of Patent: Oct. 14, 1997

[54] UNALIASED SPATIAL TRACE INTERPOLATION IN THE F-K DOMAIN

[75] Inventors: Necati Gulunay, Missouri City; Ronald Edward Chambers, Houston, both of Tex.

[73] Assignee: Western Atlas International, Inc., Houston, Tex.

[21] Appl. No.: 775,503

[22] Filed: Dec. 31, 1996

Related U.S. Application Data

[63] Continuation-in-part of Ser. No. 696,466, Aug. 14, 1996, Pat. No. 5,617,372.

[51] Int. Cl.$^6$ ........................ G01V 1/28
[52] U.S. Cl. .............. 367/38; 367/59; 364/421
[58] Field of Search .................. 367/38, 59, 63; 364/421

[56] References Cited

U.S. PATENT DOCUMENTS

| | | | |
|---|---|---|---|
| 4,594,693 | 6/1986 | Pann et al. | 367/43 |
| 4,964,098 | 10/1990 | Hornbostel | 367/38 |
| 5,235,556 | 8/1993 | Monk et al. | 367/63 |
| 5,617,372 | 4/1997 | Gulunay et al. | 367/38 |

FOREIGN PATENT DOCUMENTS 2 282 665A  12/1995  United Kingdom .

OTHER PUBLICATIONS

"Seismic Trace Interpolation in the f-x Domain", S. Spitz; Geophysics, vol. 56, No. 6 (Jun. 1991); pp. 785-794, 11 Figures.

*Primary Examiner*—Ian J. Lobo
*Attorney, Agent, or Firm*—William A. Knox

[57] ABSTRACT

A computer-aided method for providing a de-aliased output data set $d_L(t,x_L,y_L)$ from a spatially aliased, three-dimensional, input data set of known seismic signals, $a(t,x,y)$, where L is an interpolator. The known data set is zero-padded by L. The zero-padded data set is zero-masked. The zero-padded data set is divided by a zero-padded, zero-masked data set to provide an interpolation operator $H_L$. L-1 zero traces are interleaved between the known traces of data set $a(t,x,y)$ to provide a zero-inserted data set $c_L((t,x_L,y_L)$ whose transform is $C_L(m,k_{xL},k_{yL})$. The product of $(H_L)$ with $(C_L)$ is $(D_L)$ which is inverse-transformed to provide the desired de-aliased data set $d_L(t,x_L,y_L)$.

4 Claims, 5 Drawing Sheets

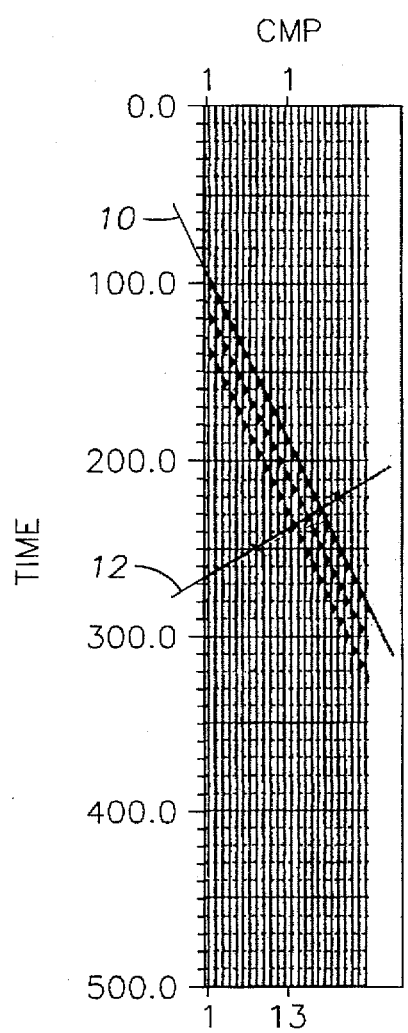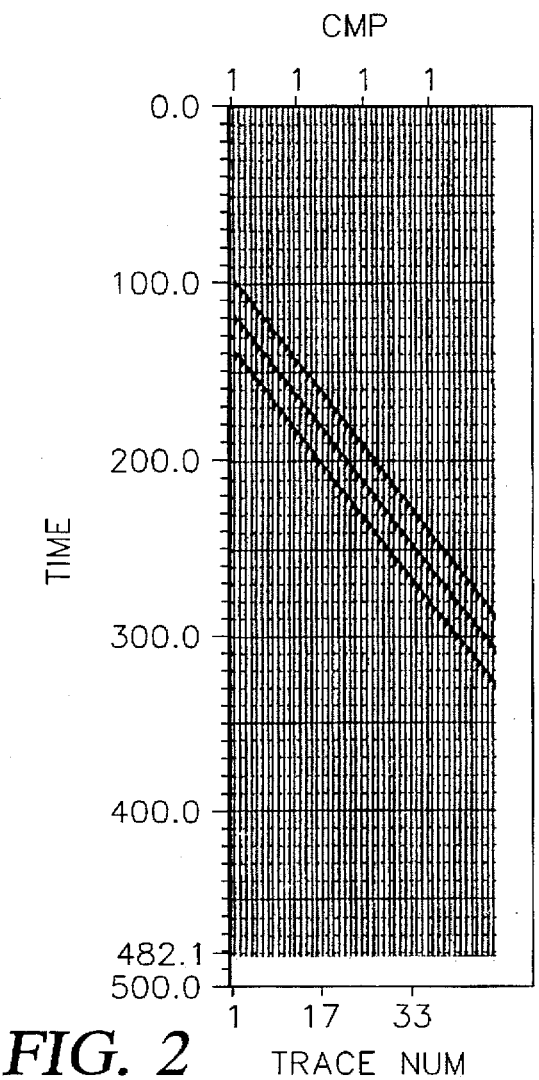
FIG. 1  FIG. 2
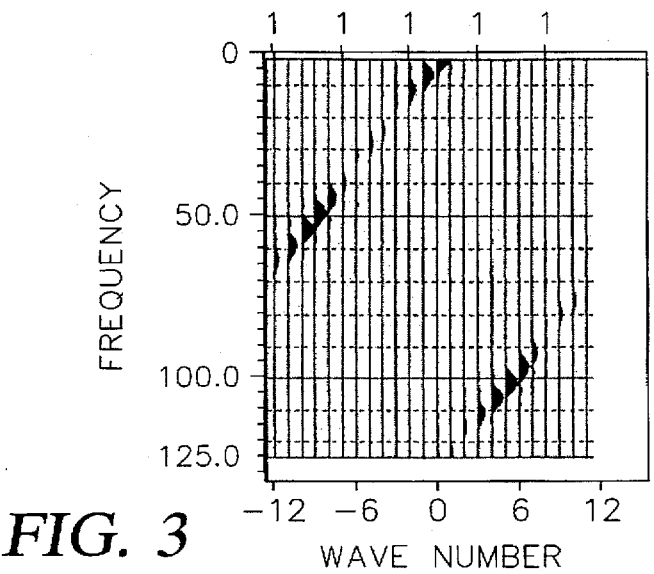
FIG. 3

$L=2$
$A_L = FT(a_L)$
$B_L = FT(b_L)$
$H_L = A_L/B_L$ $b_L = a_L(t_L, x_L, y_L) * W_L(m_x, m_y)$

UNALIASED SPATIAL TRACE INTERPOLATION IN THE F-K DOMAIN

RELATION TO OTHER PATENT APPLICATION

This application is a continuation-in-part of U.S. patent application Ser. No. 08/696,466, now U.S. Pat. No. 5,617,372, filed Aug. 14, 1996, in the name of Necati Gulunay and Ron Chambers and assigned to the assignee of this application.

BACKGROUND OF THE INVENTION

1. Field of the Invention

A method for economically de-aliasing three-dimensional spatially-aliased seismic data using trace interpolation methods in the f-k domain.

2. Discussion of Relevant Art

The art of seismic exploration requires that a plurality of acoustic receivers be disposed at designated stations distributed at regular spatial intervals over a line or area of survey. An acoustic source visits selected stations over the survey area whereupon at each station visited, it radiates an acoustic wavefield into the earth. The wavefield propagates in all directions, insonifying sub-surface strata. The wavefield is reflected from each stratum in turn, to return to the surface where the reflected wavefield is detected by the receivers.

The acoustic receivers convert the mechanical motions and pressure variations due to the propagating wavefield to electrical analog signals. The electrical signals are sent to suitable recording and processing equipment over data transmission channels of any desired type. The analog signals representative of the received acoustic wavefields are recorded as a periodic function of signal level vs. two-way wavefield reflection travel time. The periodic electrical analog signals, as seen by each of the receivers, are discretized in the time domain at selected sample intervals and then recorded as a plurality of discrete time-scale traces, one trace for each station occupied by a receiver. A suite of traces recorded at a single receiver station, due to wavefields generated from a set of sequentially-visited source locations, might comprise a common receiver gather in the time-space (t-x) domain.

For most survey operations, the useful temporal frequency of the received seismic data lies in the range of 5 to about 125+ hertz. In data-sampling theory, it is fundamental that no wavelength embedded in the data can be shorter than twice the sampling interval, otherwise the data are distorted due to aliasing. Given a selected temporal sample interval, the received seismic signals may be electrically or optically low-pass filtered before digitization in the time domain to exclude frequencies above the aliasing frequency, which is also referred to as the temporal Nyquist or temporal folding frequency. Thus for a 4-millisecond (ms) sample interval, frequencies above 125 Hz ($\lambda$=8 ms) must be excluded. Insofar as a single one-dimensional time-scale trace is concerned, selection of the proper sample interval and the corresponding anti-aliasing filter is a simple operator-selectable instrumental option.

In real life, seismic data are three-dimensional rather than uni-dimensional. Within a preselected area of survey, including a plurality of seismic traces the data reside in a 3-D, temporal-spatial (t-x-y) domain. In the presence of steeply-dipping strata, if the source or detector station spacing is too wide relative to the spatial frequency of a dipping stratum, the data will be spatially aliased.

FIG. 1 is a set of 24 synthetic time scale traces plotted from t=0.0 millisecond (ms) to t=500.0 ms and belonging to a common midpoint (CMP) gather. Three parallel events are shown having a spatial dip of 8 ms per trace in the positive direction as shown by sloping line 10. Because of the wide spacing between traces, it would be easy to mistakenly draw false or aliased negative dips of about 2.5 ms per trace as shown by sloping line 12, particularly if the data had been partially obscured by random noise. If now, there had been available a set of traces having half the spacing of FIG. 1, such as in FIG. 2 where the dip is but 4 ms per trace, there would be little doubt as to the interpretation of the correct dip.

By definition, the spatial phase shift of a coherent event is the time difference between the same event as seen on two adjacent traces. Given a cluster of events having reasonably uniform dips characterized by a narrow range of spatial frequencies, then it would be a simple matter to average the phase shift between the respective traces by inspection and interleave the averaged traces between the original traces of FIG. 1 as suggested by FIG. 2. But real data includes a whole spectrum of spatial frequencies and phase shifts. Therefore such a simplistic approach is not possible.

As is well known to the art, the spectrum of spatial frequencies is best examined by transforming the time scale data from the t-x-y (time-space) domain to the f-$k_x$-$k_y$ (frequency-wavenumber) domain using a fast Fourier transform by way of example but not by way of limitation (the wavenumber is, by definition, the number of cyclic periods per unit distance). FIG. 3 is the 2-D Fourier-transformed amplitude spectrum of FIG. 1. The data are aliased (folded) at 62.5 hertz (Hz) where the events are wrapped around the central or zero ordinate of the wavenumber axis at an angular phase shift of $\pi$.

As a matter of definitions, the temporal alias frequency in the f-k domain is $-1/2\Delta t < f < +1/2\Delta t$. In the spatial coordinate, the spatial alias frequency or wavenumber is $-\pi/\Delta x < k < +\pi/\Delta x$. Here $\Delta t$ is the sample-time interval in milliseconds and $\Delta x$ is the station spacing in preferred units.

As previously stated, selection of the temporal sample interval is a simple user-selectable, instrumental option. But selection of the spatial sampling interval on the ground is much more complex. The station spacing needs to be as sparse as possible for economic reasons because operating costs per seismic station are very expensive. The problem becomes exacerbated in designing a survey for a previously unexplored area having unknown dips. If the spatial frequencies in the area on the average, turn out to exceed the Nyquist limit expected when the original survey strategy was laid out, it may not be economical or, perhaps not even possible such as because of political upheaval, to return to the region to physically acquire additional coverage. Aliased spatial frequencies wreak havoc with migration and interpretation of the seismic data sets as explained earlier.

As a further consideration, if spatially-aliased data can be successfully interpolated during data-processing operations, then it would be possible to employ much wider and thus, more economical, station spacing during data-acquisition operations.

An interpolation scheme in the f-x domain has been developed by S. Spitz in a paper entitled *Seismic Trace Interpolation in the F-X Domain*, Geophysics, v. 56, n. 6, June, 1991, pp 785–794. The method is based on the fact that linear events present on a section made of equally spaced traces may be interpolated exactly, regardless of the original spatial interval, without any attempt to determine their true dips. The predictability of linear events in the f-x domain allows the missing traces to be expressed as the output of a linear system, the input of which consists of the recorded traces. The interpolation operator is obtained by solving a set of linear equations whose coefficients depend only on the spectrum of the spatial prediction error filter defined by the recorded traces. The prediction error filter is obtained from the known data at half the temporal frequency. The Spitz method involves two sets of linear equations, one for the prediction error filter and one for the unknown data. Accurate calculation of the unknown data requires edge-free design of the equations. This condition leads to a non-Toeplitz matrix structure that makes data-processing by the Spitz method very computer-intensive and therefore very costly.

Another method is disclosed in UK patent application GB-2,282,665-A in the name of Helmut Jakubowicz, published Dec. 4, 1995. In this disclosure, each data set such as a common receiver gather is applied to a sinc filter to generate additional data for interpolation intermediate the recorded actual data. The recorded actual data are also subject to traveltime angularity correction. Interlacing sinc data interpolated with the known data does not unwrap the spectrum but produces a spatially band-limited spectrum. Furthermore, temporal frequencies above a certain critical frequency remain wrapped along the k-axis which might necessitate temporal band-limiting of the data.

There is a need for an efficient computer-implemented method for interpolating spatially aliased, three-dimensional data sets to any desired degree of resolution, to allow wider, more economical receiver and/or source station spacing.

SUMMARY OFT HE INVENTION

This invention contemplates a computer-aided method for providing a de-aliased output data set $d(t,x_L,y_L)$ from a spatially aliased input data set of seismic signals, $a(t,x,y)$, representative of acoustic wavefields recorded in the time-space domain on an array of $N_x$ by $N_y$ known traces disposed over the x and y coordinates of an area of survey. The signals were harvested following insonification of a volume of the subsurface of the earth. L-1 zero traces are inserted along each spatial dimension between known traces of the original input data set $a(t,x,y)$ to form $c_L(t,x_L, y_L)$. An Lth-order interpolation operator is applied to $c_L(t,x_L,y_L)$ in the Fourier transform domain to provide $LN_x$ and $LN_y$ traces along the respective x and y axes. To derive the interpolation operator, zero padding in all dimensions is done to provide a zero-padded input data set $a_L(t_L,x_L,y_L)$. Data set $a_L$ is L times more populous in each dimension than $a(t,x,y)$. A masking operator $w_L$ is applied to the zero-padded input data set to provide a zero-padded, zero-masked data set $b_L(t_L,x_L,y_L)$. Data set $a_L(t_L,x_L,y_L)$ is transformed to the $m_L,k_{xL},k_{yL}$ domain to provide a first spectrum $A_L(m_L,k_{xL},k_{yL})$ where m is the temporal frequency index of the zero-padded volume. The zero-padded, zero-masked data set is Fourier transformed to the $m_L,k_{xL},k_{yL}$ domain to provide a second complex spectrum $B_L(m_L,k_{xL},k_{yL})$. Assuming that original data set $a(t,x,y)$ contains $N_f$ temporal frequencies, then the zero-padded data set and the zero-padded, zero masked data set each contains $LN_f$ frequencies. Out of $LN_f$ frequencies, only the first $N_f$ frequencies are used for designing the interpolation operator. An interpolation operator $H_L(m_L,k_{xL},k_{yL})$ is formed from $A_L(m_L,k_{xL},k_{yL})/B_L(m_L,k_{xL},k_{yL})$. The data set $c_L(t,x_L,y_L)$ is transformed to the to the $f,k_{xL},k_{yL}$ domain as $C_L(m,k_{xL},k_{yL})$. Complex spectra of the respective de-aliased interpolated output data traces are obtained from the formulation $D_L(m, k_{xL},k_{yL})=H_L(m,k_{xL},ky_{yL}) \times C_L(m,k_{xL},k_{yL})$ for $N_f$ temporal frequencies. The de-aliased output traces $d_L(t,x_L,y_L)$ in the time-space domain are obtained from the inverse transform of $D_L(m,k_{xL},k_{yL})$.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 1 is a display in the t-x domain of known, sparsely-sampled seismic data;

FIG. 2 is a display of seismic traces exhibiting well-sampled seismic data;

FIG. 3 shows the data of FIG. 1 transformed from the t-x domain to the f-k domain showing frequency wrapping due to spatial aliasing;

DETAILED DESCRIPTION OF THE PREFERRED EMBODIMENT

FIG. 1–3 were discussed earlier in this disclosure to explain the evils of spatial aliasing.

Figure 4:
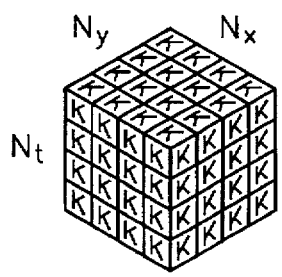
FIG. 4 is a three-dimensional volume of known seismic data which may be aliased.

FIG. 4 represents a volume of the earth that has been insonified to provide a 4×4×4, three-dimensional data set, expressed in the time-space domain as $a(t,x,y)$, of seismic traces in terms of receiver coordinates Nx and Ny in rows and ranks horizontally and discrete two-way reflection travel times Nt in columns vertically. The quantity N, taken in context, indicates the trace number or time-sample number associated with a given cell. In FIG. 4, N=4. Each cell may contain a single datum or an average of a bin-full of samples of known, (indicated by the symbol K), closely-related data.

No matter what optimum station spacing may have been chosen initially during data acquisition, there may exist some desired spatial frequencies for which inter-trace interpolation or de-aliasing will be needed during data processing. The required Lth-order spatial resolution may demand that one or more intermediate traces be inserted between any two known traces $Nx_i$, $Nx_{i+1}$ and $Ny_j$, $Ny_{j+1}$, where the Lth-order interpolator L may assume values 2, 3, . . .

In the exegesis next to follow with respect to FIGS. 5A–5D, for simplicity it will be assumed that L=2 and N=4. It is desired to increase the spatial resolution of $a(t,x,y)$, FIG. 4, by interlacing (L-1) zero traces (in this case, since L=2 a single trace is interlaced) symbolized by 0, between any two known traces K to provide $LN_x$ and $LN_y$ traces as an interlaced data set $c_L(t,x_L,y_L)$, illustrated in FIG. 5C, hereinafter referred to as ($c_L$) for brevity. Stretching the spatial dimensions by L lowers the frequency L times.

Trace interpolation in phase and amplitude is required over all frequencies less than Nyquist. That operation is best performed by transforming the data set from the time-space (t,x,y) domain to the frequency/wave-number (f,$k_x$,$k_y$) domain using any well-known computer-aided Fast Fourier Transform (FT) algorithm. It is therefore required to discover an interpolation operator $H_L$(m,$k_{Lx}$,$k_{Ly}$), where m is a frequency index, which can be applied to the FT transform $C_L$, of data set ($c_L$) to generate the desired de-aliased data set of FIG. 5D, $d_L$(t,$x_L$,$y_L$)=$FT^{-1}$ ($C_L \times H_L$).

Thus, whereas there were N traces initially along the x and the y axes, after interpolation there are LN traces along each of the x and y axes; that is, the data set is L data set is L times more populous along each axis than the original data set. Hence, in the f-k domain, the range of wave numbers $k_L$ for the interpolated data set is L times larger than the range of wave numbers k associated with the original data set.

Next, consider that the known data set a (t,x,y) is a miniature version of the desired output data set. We can divide its stretched complex spectrum (phase and amplitude) $A_L$(m,$k_x$,$k_y$) at temporal frequency f/L by the stretched complex spectrum of the zero-masked input data set (N traces) to obtain $H_L$(m,$k_{Lx}$,$k_{Ly}$). Zero masking may be performed by zeroing traces except at locations 1+$n_x$L, 1+$n_y$L ($n_x$,$n_y$=0,1,2, . . . ).

Figure 5A:
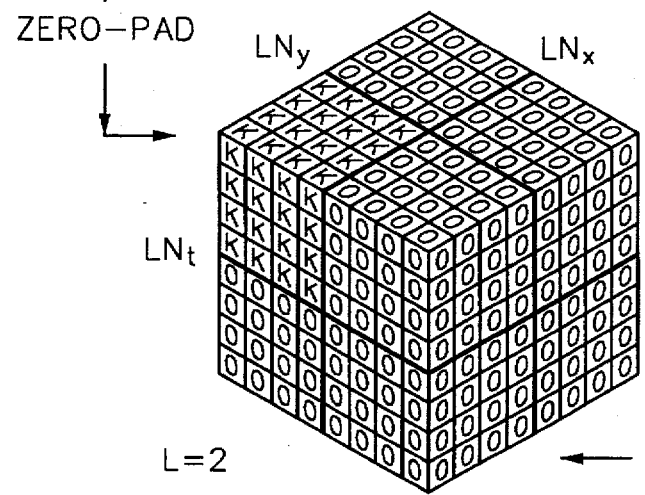
FIG. 5A represents the data volume of FIG. 4 following zero-padding.

However, we need LN $k_L$-samples. To avoid interpolating wave numbers in the Fourier transform domain, the input to the transform is zero-padded with (L−1)N zeros along the spatial dimensions. Since we need temporal frequency f/L, zero padding is extended along the temporal axis as shown in FIG. 5A to form data set $a_L$($t_L$,$x_L$,$y_L$), (for brevity, ($a_L$)), whose Fourier transform is $A_L$=[FT $a_{(L)}$]. The subscripted variables $t_L$, $x_L$ and $Y_1$ indicate that the range of x, y and t have been extended by a factor of L, even though that was done using zero padding.

Figure 5B:
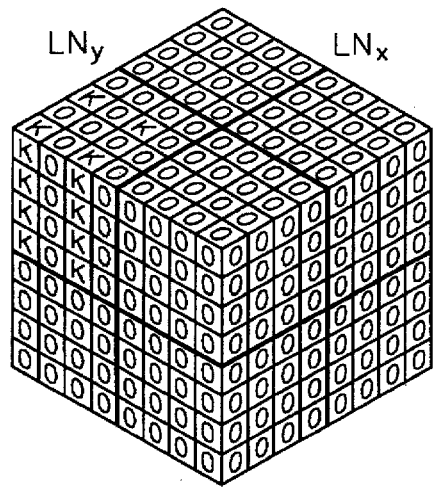
FIG. 5B is the zero-padded data volume of FIG. 5A after zero masking.

The trace-zeroing operation is applied to the zero-padded data set ($a_L$) to provide zero-padded, zero masked data set $b_L$($m_L$,$x_L$,$y_L$) (hereinafter ($b_L$)) as shown in FIG. 5B, whose Fourier transform is $B_L$=[FT ($b_L$)].

The interpolation operator $H_L$ is computed from the ratio:

$$H_L(m,x_L,y_L) = A_L(m_L,k_{xL},k_{yL})/B_L(m_L,k_{xL},k_{yL}).$$

FIGS. 4 and 5A–D are intended to serve as a graphic flow diagram to illustrate the best mode of operation for mechanizing the process of this invention which would normally be performed with the aid of a suitably-programmed computer.

Figure 6A:
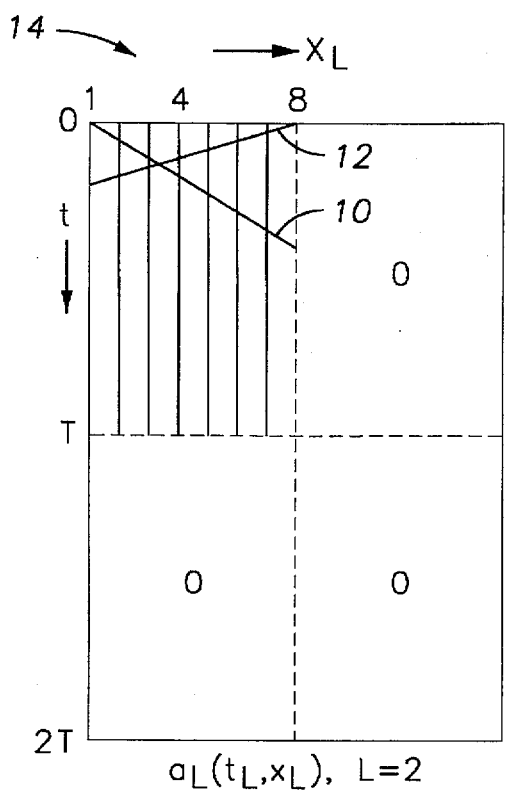
FIGS. 6A–6D illustrate, in a simplified manner, the processing sequence shown in FIGS. 5A–5C for a two-dimensional data set in the presence of one aliased and one non-aliased seismic event.

Please now refer to FIGS. 6A–D and 7A–D jointly. FIGS. 6A–D represent a set of seismic traces in the t,x domain, shown in two dimensions for simplicity of display. Two dipping events 10 and 12 are present. Event 10 exhibits twice the dip of event 12. The upper left hand portion 14 of FIG. 6A represents the original input data set but with zero padding.

Figure 7A:
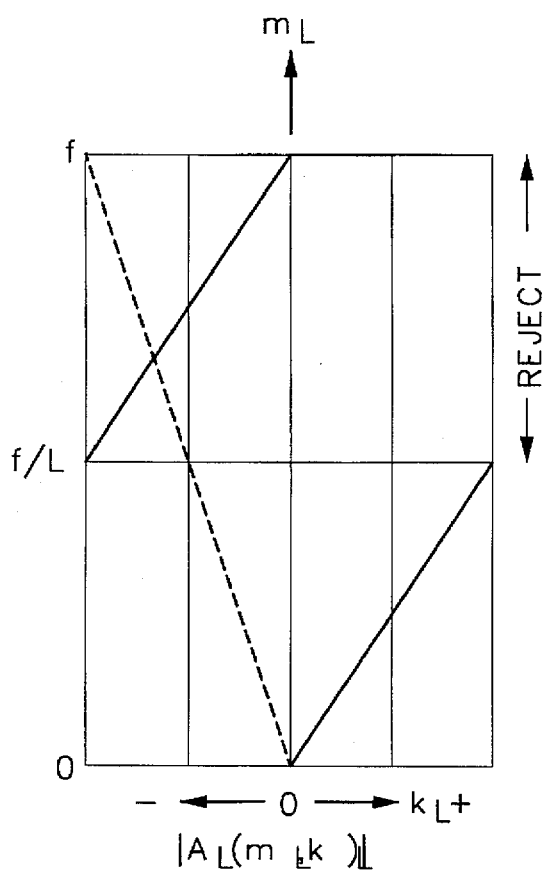
FIGS. 7A–7D are the amplitude spectra corresponding to the data sets shown in FIGS. 6A–6D respectively.

FIG. 7A is the Fourier transform $A_L$ in the $m_L$–$k_L$ domain of the data set ($a_L$) of FIG. 6A. Event 10 is aliased and wraps around the central k axis as 16 and 18. Event 12 remains unaliased as event 20.

Figure 6B:
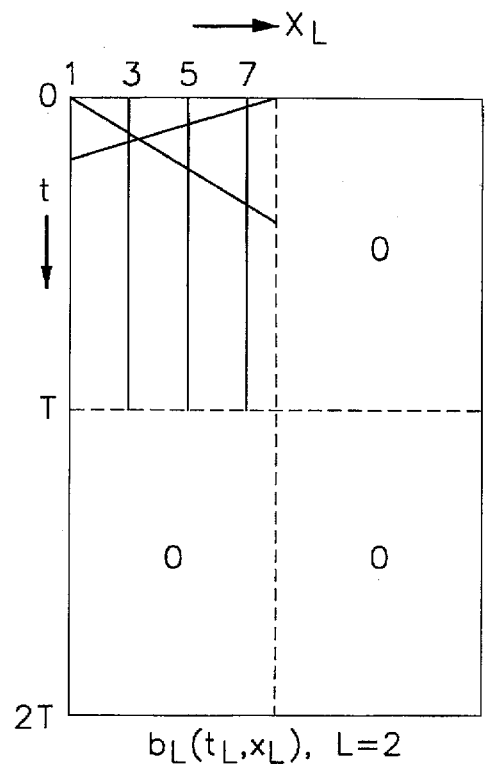
Figure 7B:
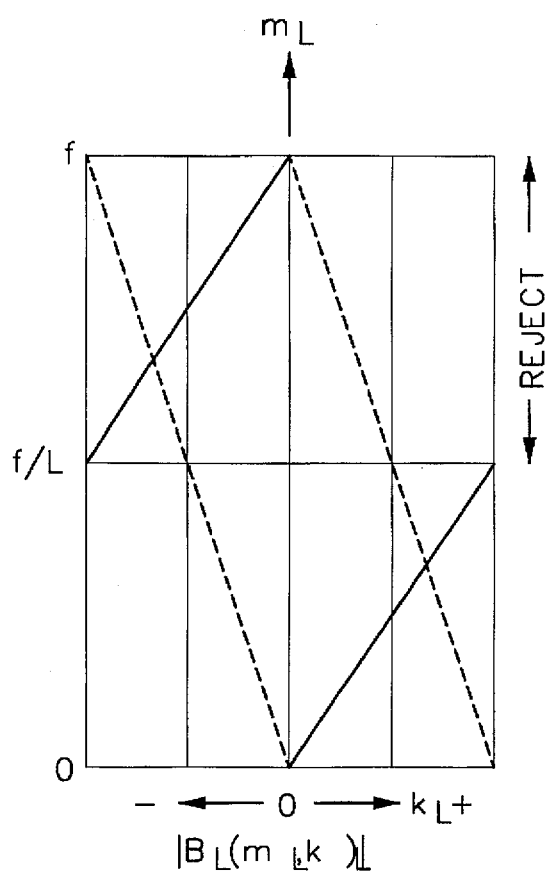

FIGS. 6B and 7B are the two-dimensional displays of the zero-padded, zero-masked data sets of FIG. 5B in the $t_L$,$x_L$ and $m_L$,$k_L$ domains respectively. The interpolation operator $H_L$ is derived from the ratio between the complex spectrum of FIG. 7A divided by the complex spectrum of FIG. 7B after rejection of the frequency portion above Nyquist as marked in the Figures.

Figure 5C:
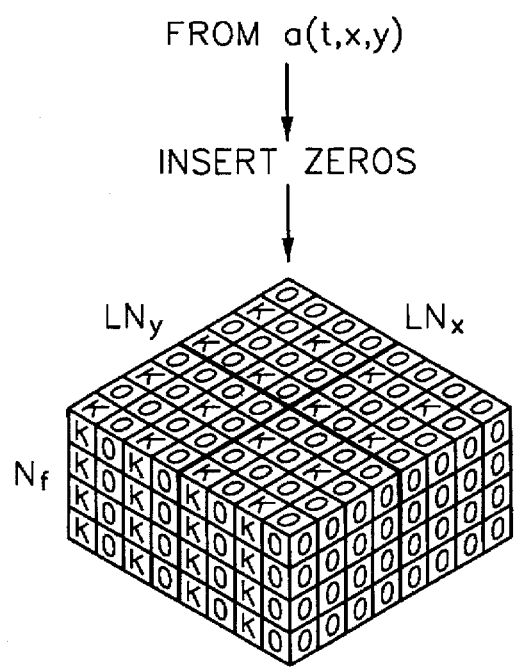
FIG. 5C is the data volume of FIG. 4 after zero-insertion.
Figure 5D:
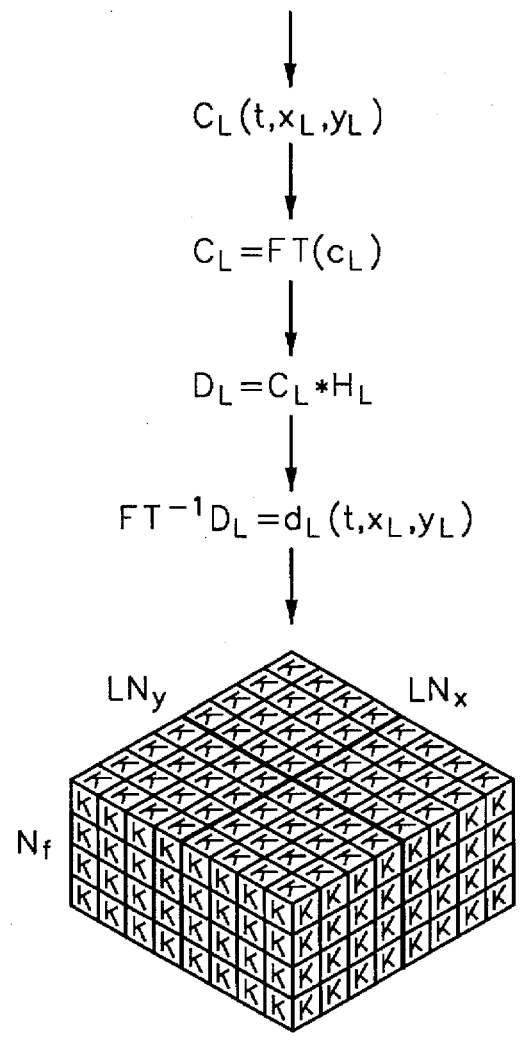
FIG. 5D is the data volume of FIG. 5C after transformation of the data volume from the t-x-y domain to the m-kx-ky domain, application of an interpolation operator and inverse transformation from the m-kx-ky domain back to the t-x-y domain.
Figure 6C:
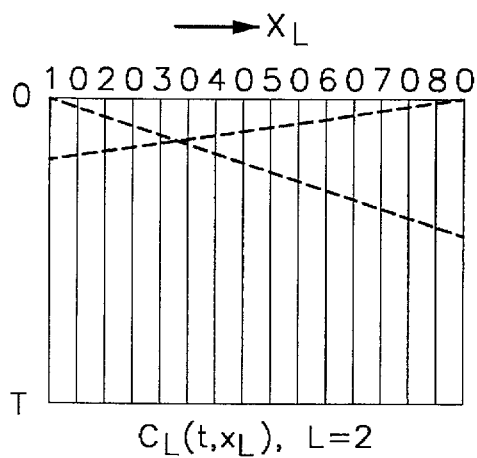
Figure 6D:
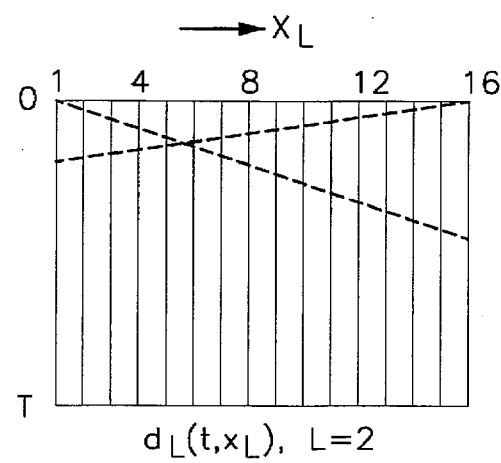

FIG. 6C is a vertical slice along the temporal axis of the x-coordinate of the input data set ($c_L$) with (L−1) zero traces inserted between known traces as previously displayed in FIG. 5C. The sloping line segments intersecting the even-numbered traces indicate the dip attitude of the now fragmented seismic events 10 and 12.

Figure 7C:
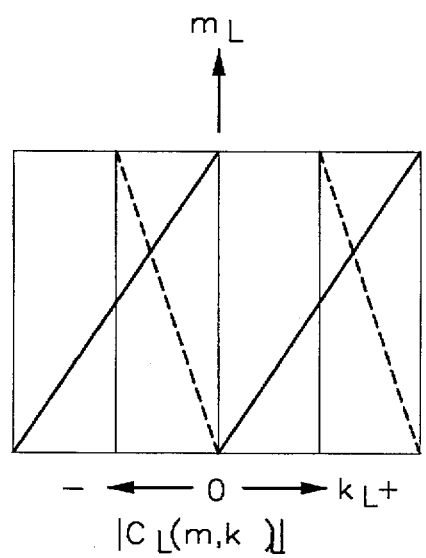
Figure 7D:
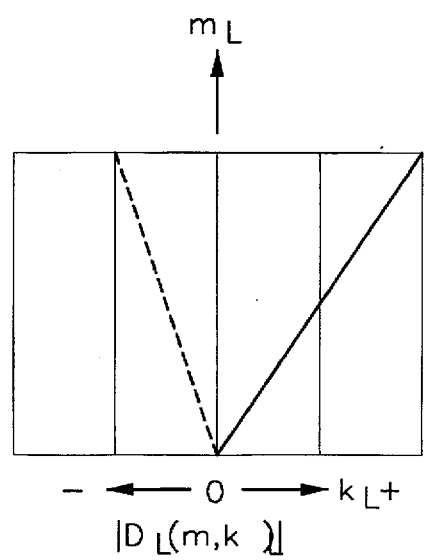

It is the mission of the interpolation operator $H_L$ to fill-in the empty traces in respect to signal phase shift and amplitude. That mission is accomplished by multiplying the Fourier transform $C_L$ shown in FIG. 7C by the transform of interpolation operator $H_L$ to yield the m,k transform of the de-aliased data set $D_L$ as shown in FIG. 7D. The inverse transform, [$FT^{-1}$ ($D_L$)]of FIG. 7D provides the desired de-aliased output data set ($d_L$) from FIG. 6D.

Certain substantial cost savings can be made in processing these data using the method of this invention. Observe that the amplitude spectra in FIG. 7C are periodic. That is, the second half of the positive $k_L$ axis can be obtained from the first half of the negative $k_L$ axis and the second half of the negative $k_L$ axis can be obtained from the first half of the positive $k_L$ axis. Therefore, the f-k transform of the original input a(t,x) (no padding) can be copied to get $C_L$, FIG. 7C.

The zero-padded, zero-masked complex amplitude spectrum of FIG. 7B can be obtained from the complex amplitude spectrum of FIG. 7A by wrapping the spectrum laterally by N samples (this example has 2N $k_L$ samples). That is, the f-k transform of FIG. 7A is shifted by half of the $k_k$ range and summed onto itself. That is equivalent to summing values in the negative $k_L$ axis to the values in the positive $k_L$ axis and also summing values from the positive $k_L$ to the negative $k_L$ axis. When the interpolation order is greater than 2, then, as the f-k transform is shifted N samples at a time, the samples falling outside of the −LN/2,+LN/2 range are wrapped back before summation.

Thus, the steps of wrapping $A_L$ to obtain $B_L$ and copying along the $k_L$ axes to obtain $C_L$ replace the otherwise time-consuming array manipulation that is required for conventional complex amplitude spectral analyses.

The invention has been described in terms of seismic-signal arrays but it can be applied to any desired type of spatially-sampled signal mapping processes such as, for example, modeling of weather systems based on data derived from spaced-apart meteorological stations.

Those skilled in the art will devise obvious variations to the examples given herein which may perform the same function in substantially the same way to produce substantially the same results and which will fall within the scope and spirit of this invention which is limited only by the appended claims and equivalents thereof.

What is claimed is:

1. A computer-aided method for providing a de-aliased output data set $d_L$(t,$x_L$,$y_L$), where the subscripted quantities $x_L$ and $y_L$ indicate the range of x and y in a de-aliased data set $d_L$ as extended by an Lth-order interpolation in the time domain, derived from a spatially aliased input data set of seismic signals, a(t,x,y), representative of acoustic wavefields recorded in the time-space domain on an array of $N_x$ by $N_y$ known traces disposed over the x and y coordinates of an area of survey, where is the number of traces under consideration along the respective axes, the signals having been harvested following insonification of a volume of the subsurface of the earth, comprising:

i) applying an Lth-order operator to known input data set a(t,x,y) to provide $LN_x$ and $LN_y$ traces along the respective x and y axes by zero-padding a(t,x,y) in all dimensions thereby to provide a zero-padded input data set $a_L$($t_L$,$x_L$,$y_L$) L times more populous in each dimension than a(t,x,y), $t_L$ being the quantity t as extended by the interpolation operator L;

ii) executing a masking operation $w_L$ to the zero-padded input data set $a_L(t_L,x_L,y_L)$, to provide a zero-padded, zeromasked data set $b_L(t_L,x_m,y_L)$;

iii) transforming $a_L(t_L,x_L,y_L)$ to the $m_L,k_{xL},k_{yL}$ domain where the quantities $m_L$, $k_{xL}$, $k_{yL}$ are the frequency domain transforms corresponding to the extended quantities $t_L$, $x_L$, $y_L$ from the time domain, to provide a first complex amplitude spectrum $A_L(m_L,k_{xL},k_{yL})$, where m is a temporal frequency index of the zero-padded volume for each of the first $N_f$ temporal frequencies, and rejecting the remainder of the $LN_f$ temporal frequencies;

iv) transforming $b_L(t_L,x_L,y_L)$ to the $m_L,k_{xL},k_{yL}$ domain to provide a second complex amplitude spectrum, $B(m_L, k_{xL},k_{yL})$ for $N_f$ frequencies and rejecting he remainder of the $LN_f$ temporal frequencies;

v) forming an interpolation operator $H(m_L,k_{xL},k_{yL})$, from $A(m_L,k_{xL},ky_L)/B(m_L, k_{xL},k_{yL})$;

vi) inserting L-1 zero traces in each spatial direction between known traces of the original input data set a(t,x,y), to form $c_L(t,x_L,y_L)$;

vii) transforming $c_L(t,x_L,y_L)$ to the f-$k_{xL}$-$k_{yL}$ domain as $C_L(m,k_{xL},k_{yL})$ to provide complex amplitude spectra of the respective de-aliased interpolated output data traces from the formulation $D_L(m,k_{xL},k_L)=H_L(m,k_{xL},k_L)\times C_L(m,k_{xL},k_{yL})$ for the first $N_f$ frequencies;

viii) inverse-transforming the amplitude spectra of the de-aliased output traces, $D_L(m,k_{xL},k_{yL})$, from the f-$k_{xL}$-$k_{yL}$ domain to the $t,x_L,y_L$ domain.

2. The method as defined by claim 1, wherein:
L=2.

3. The method as defined by claim 2, wherein:
$w_L(m_x,m_y)$ is equal to unity when and only when $m_x=1+n_xL$ and $m_y=1+n_yL$ (n=0,1,2, ...) else $w_L$ is equal to zero.

4. A computer-aided method for providing a de-aliased output data set $d_L(t,x_L, y_L)$ derived from a spatially aliased input data set of known seismic signals, a(t,x,y), having a complex amplitude spectrum $K(f,k_x,k_y)$ in the f-k domain, $k_x$ and $k_y$ being the wave numbers in the frequency domain along the corresponding x and X axes and representative of acoustic wavefields recorded in the time-space domain on an array of $N_x$ by $N_y$ known traces where N is the number of traces, disposed over the x and y coordinates of an area of survey, the signals having been harvested following insonification of a volume of the subsurface of the earth, comprising:

i) selecting an Lth-order stretch factor, L;

ii) zero-padding a(t,x,y) by L to provide a zero-padded data set $a_L(t_L,x_L,y_L)$ where the subscripted quantities $t_L$, $x_L$ and $y_L$ indicate the range of t, x and y of data set a, as extended by the Lth-order stretch factor in the time domain;

iii) transforming the zero-padded data set from the time-space domain to the frequency-wavenumber domain to provide a first truncated complex amplitude spectrum $A_L(m_L,k_{xL},k_{yL})$ after rejecting a selected portion of the frequency spectrum thereof, m being a frequency index, the subscripted quantities $m_L$, $k_{xL}$, $k_{yL}$, being the frequency-wave number-transforms corresponding to the extended quantities $t_L$, $x_L$, $y_L$ from the time domain;

iv) laterally wrapping the stretched transform about itself along the wavenumber axes to provide a second truncated complex amplitude spectrum $B_L(m_L,k_{xL},k_{yL})$ after rejecting a selected portion of the frequency spectrum thereof;

v) generating an interpolation operator $H_L(m,k_{xL},k_{yL})$ by dividing said first truncated complex amplitude spectrum by said second truncated amplitude spectrum;

vi) laterally copying $K(f,k_x,k_y)$ L-1 times to provide a complex amplitude spectrum of a zero-inserted, known data set $C_L(m,k_{xL},k_{yL})$;

vii) creating a de-aliased transform from the formulation $$D_L(m,k_{xL},k_{yL})=H_L(m,k_{xL},k_{yL})\times C_L(m,k_{xL},k_{yL});$$

and ix) inversely transforming $D_L(m,k_{xL},k_{xL})$ to the time-space domain to provide a de-aliased data set $d_L(t,x_L, y_L)$.

* * * * *